Figure 1:
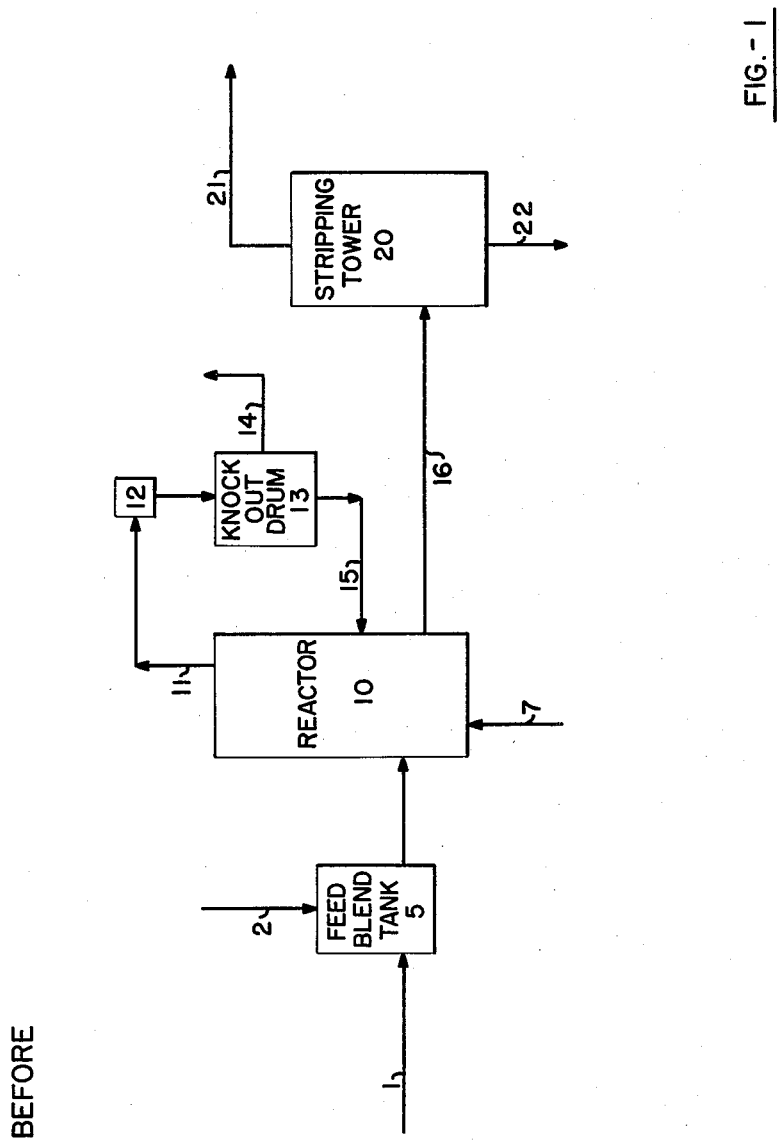

June 27, 1961 D. D. DUNLOP ET AL 2,990,433
REMOVING ORGANIC ACIDS FROM A POLYMER
Filed Dec. 19, 1958 2 Sheets-Sheet 1

Donald Dunwody Dunlop
Neville Leverne Cull   Inventors

By C.D. Stores   Attorney

June 27, 1961   D. D. DUNLOP ET AL   2,990,433
REMOVING ORGANIC ACIDS FROM A POLYMER
Filed Dec. 19, 1958   2 Sheets-Sheet 2

Donald Dunwody Dunlop
Neville Leverne Cull   Inventors
By C. D. Stores   Attorney

United States Patent Office 2,990,433
Patented June 27, 1961

2,990,433
REMOVING ORGANIC ACIDS FROM A POLYMER

Donald Dunwody Dunlop, Baton Rouge, and Neville Leverne Cuil, Baker, La., assignors to Esso Research and Engineering Company, a corporation of Delaware
Filed Dec. 19, 1958, Ser. No. 781,605
6 Claims. (Cl. 260—669)

This invention relates to various methods for removing the organic acids formed as a polydiolefin is being blown with air and more particularly to the improved oxidized polymer therefrom.

It is known to air-blow a polydiolefin in a hydrocarbon solvent to incorporate oxygen in its structure with subsequent stripping to remove this solvent from the resulting oxidized polymer. However, organic acids, e.g., formic acid, are produced during this procedure. It has been found that these acids must be minimized in the final oxidized polymer; otherwise, corrosion will occur in the linings of drums where the polymer is stored. Furthermore, a high concentration of acids has a deleterious effect if the polymer is incorporated into paints since the acids react with the pigments therein to form a gel.

In the past, it has been necessary to discard the solvent after the stripping operation. The reason being that the solvent has a high concentration of formic acid therein and it could not be recycled to the feed blend tank without increasing the acid content in the final air blown polymer.

It has now been discovered that several methods can be employed to alleviate this acid problem in the aforementioned oxidized polydiolefin oil. These methods will be described in detail in ensuing paragraphs.

Polymeric oils included in the present invention are prepared from diolefins, particularly those which are conjugated and have 4 to 6 carbon atoms per molecule, such as butadiene, hexadiene, isoprene, dimethyl butadiene, piperylene, and methyl pentadiene. Diolefins may be used are copolymerized with minor amounts of ethylenically unsaturated monomers as styrene, acrylonitrile, methyl vinyl ketone, or with styrenes having alkyl groups substituted on the ring, e.g., paramethyl styrene, dimethyl styrene, etc.

A preferred diolefin polymeric oil is one prepared by reacting 75 to 100 parts of butadiene and 25 to 0 parts of styrene in the presence of metallic sodium catalyst. Polymerization is carried out in a reaction diluent at temperatures from about 25° C. to 105° C. with about 0.5 to 5 parts of finely divided sodium per 100 parts of monomers used. The diluent used in the polymerization must boil between about —15° C. and 200° C., in amounts ranging from 100 to 500 parts per 100 parts of monomers; preferred diluents are aliphatic hydrocarbons such as solvent naphtha or straight-run mineral spirits such as Varsol. In order to obtain a water white product, a codiluent, about 10 to 45 parts per 100 parts of monomers, may also be used, consisting of a $C_4$ to $C_8$ aliphatic ether or cyclic ethers and polyethers other than those having a —O—C—O— grouping; particularly useful ethers are dioxane 1,4 and diethyl ether. Finally, it is beneficial to use about 5 to 35 weight percent, based on sodium, of an alcohol such as methanol, isopropanol, or an amyl alcohol in order to overcome the initial induction period. The resulting product may vary in viscosity from 0.15 to 20 poises. The preparation of this oil in the presence of an alkali metal or peroxide catalyst is described in U.S. Patents 2,762,851 and 2,586,594, which are incorporated herein by reference.

These polymeric oils are then oxidized by blowing them with air or oxygen, preferably in the presence of a solvent, as aromatic solvents or solvent mixtures having a Kauri Butanol value of at least 50. Preferred compounds are the oxidized copolymers of 75 to 85% butadiene and 25 to 15% styrene with about 10 to 20% oxygen in the structure. The choice of solvents will depend upon the oxygen content desired in the finished oil, the formation of the coating compositions, and the most economical one to achieve the desired results. Examples of suitable solvents include aromatic hydrocarbons, with or without aliphatic hydrocarbons, boiling up to about 250° C., preferably between 100° and 200° C. The oxidation can be carried out by blowing air or oxygen into the polymer with or without a catalyst. Suitable catalysts, if employed, are organic salts of metals such as cobalt, lead, iron, and manganese. The naphthanates, octonates, and oleates are especially suitable. These catalysts are used in amounts ranging from 0.001% to 1.0%. The nature of the oxidized diolefin polymer largely depends upon the type of original polymerization and the extent of oxidation which is dependent upon various factors as time, temperature, catalyst, and solvent. The deleterious acids formed during the preparation of this oxidized polydiolefin are $C_1$ to $C_6$ parafins, e.g., formic, acetic, propionic, acrylic, and mixtures thereof. These acids, if present within a range of 2.0 to 5.0 parts per 100 parts by weight of polymer, cause considerable difficulty in the final commercial product.

In accordance with the first embodiment of this invention, the solvent and acids are stripped from the air blown polydiolefin and subsequently contacted with water to provide an upper layer of solvent which is substantially free of acids and a lower layer of water and acid. After the upper layer is withdrawn it is dried and the purified solvent is recycled to the feed blend tanks to provide a continuous process.

Figure 2:
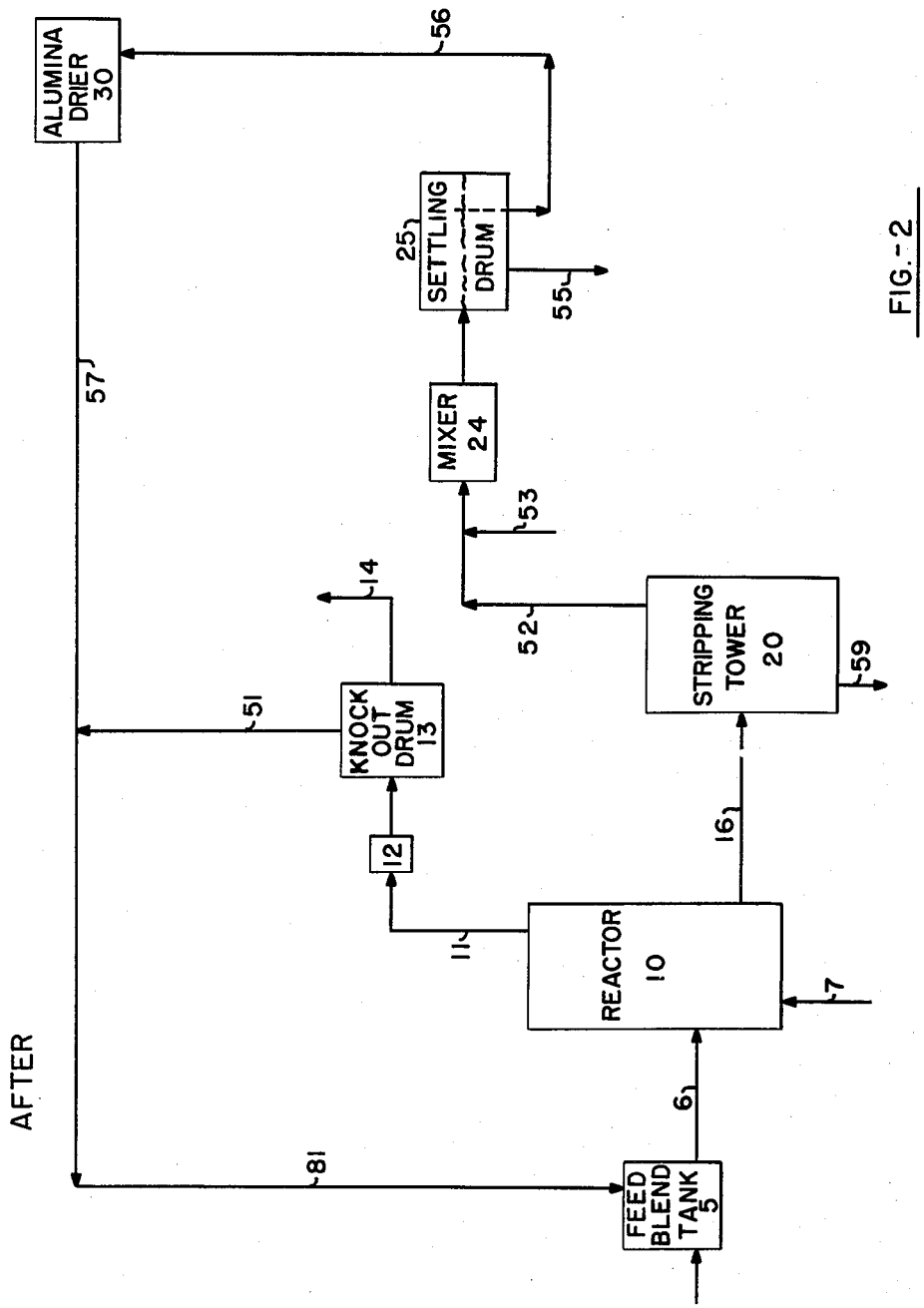

This first embodiment may be fully understood from the following description in conjunction with the accompanying drawings in which FIG. 1 represents the process previously employed and FIG. 2 demonstrates the process in accordance with this invention.

Referring now to FIG. 1, the catalyst and polymer are introduced into feed blend tank 5 by means of line 1. Through line 2 is introduced fresh solvent for preparing the polymeric solution in feed blend tank 5. This polymer solution is withdrawn from outlet 6 and introduced into reactor 10. Air is introduced in reactor 10 through line 7, where it is subsequently blown through the polymeric solution. Part of the solvent is vaporized and residual nitrogen from the air is formed in reactor 10 and the two pass through overhead line 11 and condenser 12 to knockout drum 13, where the nitrogen is separated and withdrawn by means of line 14. The solvent from knockout drum 13 is removed and recycled through line 15 to reactor 10. From the bottom of the reactor 10 is withdrawn the oxidized polydiolefin in the remaining portion of hydrocarbon solvent and the solution is passed through line 16 to stripping tower 20. The function of stripping tower 20 is to remove additional solvent through overhead line 21 and to withdraw an air blown polydiolefin of higher polymer concentration from the bottom. It should be noted, however, that the solvent withdrawn from line 21 has a high concentration of acid, e.g., formic acid. Therefore, this solvent is discarded and cannot be used as recycle for feed blend tank 5. If the solvent with acid therein was recycled, the concentration of acid in the oxidized polymer withdrawn in line 22 would build up to a value of above 2 parts of acid per 100 parts of polymer. Consequently, the polymer could not be stored in drums and the acids therein would have a deleterious effect when the polymer was mixed with paint pigments.

In accordance with the first embodiment of this invention, as shown in FIG. 2, catalyst and polymer are introduced into feed blend tank 5 through line 1 wherein a polymeric solution is provided. This solution is passed through line 6 into reactor 10 and is blown with air introduced through line 7. Vaporized solvent and inert nitrogen are withdrawn through overhead line 11 and pass through condenser 12 to knockout drum 13 in order to separate the nitrogen, line 14, from the solvent. However, it has been found advantageous to recycle the recovered solvent to the feed blend tank by means of lines 51 and 81. In reactor 10 paraffin acids, e.g., formic acid, are formed, which are withdrawn through line 16 with the oxidized polymeric solution to be introduced into stripping tower 20. From the top of tower 20, the hydrocarbon solvent and deleterious acid (0.01 to 2 parts per 100 parts of solvent) are removed through outlet 52. However, in accordance with this invention 10 to 200 parts of water (per 100 parts of solvent) are introduced in line 53 and the two streams are agitated in mixer 24 and subsequently transported into settling drum 25. This drum 25 provides an upper layer comprising solvent relatively low in acid concentration and a lower layer comprising water and an acid reaction product. The lower layer is withdrawn through line 55 and discarded. The upper layer is passed through a suitable (e.g., alumina) drier 30 by means of line 56. The dried solvent is then recycled through lines 57 and 81 to feed blend tank 5. Since the acid concentration in recycle solvent is relatively low, the oxidized polymer withdrawn in outlet 59 from stripping tower 20 also has an acid concentration within the preferred limits of 0.3 to 1.5 parts of acid per 100 parts by weight of polymer. Thus, it is now possible to recycle the solvent and produce a final product which can be used commercially.

In accordance with a second embodiment of this invention, a $C_4$ to $C_6$ conjugated diolefin is polymerized and air blown to incorporate oxygen in its structure. The oxidized polymer is subsequently treated with a basic absorbent. Preferred adsorbents are alumina ($Al_2O_3$), magnesia (MgO), and lime (CaO) with magnesia being especially preferred. It is also possible to mix a filter aid material, e.g., fuller's earth, kieselguhr, and attapulgite, with the basic adsorbent. Anion exchange resins, e.g., Amberlite IRA-410 or IRA-45 could also be used to remove the acids. Successful use of these resins may involve conditioning them for use in anhydrous media by well known techniques. Also Amberlite IRA-410 cannot be used at temperatures above 105° F. It is within the purview of this invention to treat 100 parts of polymer with 1 to 10 parts of basic adsorbent, preferably 1 to 5 parts, at a temperature generally between 60° F. and 200° F. for 30 minutes to 4 hours. This treated polymer can then be filtered to provide an end product with a relatively low acid concentration between 0.3 to 1.5 parts of acid per 100 parts of polymer.

A third embodiment of the present invention is as follows: An air blown polydiolefin is prepared by the procedure heretofore described with the undesirable paraffin acids being formed therein. An alkyl alcohol, e.g., methanol, is subsequently incorporated to react with the organic acid. The reaction products are esters which are easily removed from the polymer in a stripping operation. The organic alcohols within the scope of this embodiment are those which will react to form an ester with a boiling point below 200° F. The preferred alcohols are $C_1$ to $C_4$ paraffins, e.g., methanol, ethanol, propanol, butanol, and the like. Generally, 1 to 5 parts of these alcohols are added to 100 parts of the polymer, preferably 1 to 2 parts.

The instant invention also has a fourth embodiment. Previously, a polydiolefin was oxidized and subsequently stripped to provide a bottoms stream comprising 58 to 60 parts polymer per 100 parts of solvent. However, it has been discovered that the acid concentration can be lowered to a range of 0.3 to 1.5 parts per 100 parts of polymer by stripping the oxidized polymeric solution to provide a bottoms stream with 75 to 80 parts of polymer per 100 parts by weight of solvent. The bottoms stream can then be diluted to a lower concentration by adding a hydrocarbon solvent, e.g., benzene, toluene, or xylene.

It is within the purview of this invention to use these embodiments alone or in any combination thereof to prepare an oxidized polydiolefin with a relatively low acid content between 0.3 to 1.5 parts per 100 parts of polymer. Accordingly, the serious disadvantages experienced in the past have now been overcome.

The following examples are submitted to illustrate and not to limit this invention.

*Example I*

A butadiene-styrene oil was prepared from the following charge:

| | Parts |
|---|---|
| Butadiene-1,3 | 80 |
| Styrene | 20 |
| Varsol [1] | 200 |
| Dioxane | 40 |
| Isopropanol | 0.2 |
| Sodium [2] | 1.5 |

[1] Straight-run mineral spirits; API gravity, 49.0; flash, 105° F., boiling range, 150° to 200° C.; solvent power, 33-37 Kauri-Butanol value (reference scale: Benzene-100 K.B. value, n-heptane 25.4 K.B. value).
[2] Dispersed to a particle size of 10 to 50 microns by means of an Eppenbach homo-mixer.

The polymerization of this charge was carried out at 50° C. in a 2-liter autoclave provided with a mechanical agitator. Complete conversion was obtained in 4.5 hours. The catalyst was destroyed and removed from the resulting crude product and essentially all of the solvent removed by stripping to give a product of essentially 100% N.V.M. The resulting product had a viscosity of 1.5 poises at 50% N.V.M. in Varsol solution and the nonvolatile portion thereof had an average molecular weight of about 8,000.

A polymeric solution was then provided in a reactor comprising 35 wt. percent of the above copolymer in Solvesso (high percentage of aromatics with an API gravity of 30.2, a flash point of 118° C., and a boiling range of 322°–351° F.). The solution was blown with oxygen for 2 hours at 245 F. in the presence of 0.01 wt. percent of manganese naphthenate as a catalyst to incorporate 10% oxygen in the structure of the copolymer. The solution was then stripped at a temperature of 210 F. to provide an overhead stream comprising 0.5 gm. of acid per 100 gms. of solvent. This stream was transported to a settling drum where 100 gms. of water were introduced per 100 gms. of solvent. An upper layer was formed in the drum comprising 0.05 gm. of acid per 100 gms. of acid per 100 gms. of water. The upper layer was returned as recycle to the polymerization operation. The final product withdrawn from the bottom of the stripping tower contained 0.8 gm. of acid per 100 gms. of the oxidized diolefin. This end product with the low acid content can be readily stored and can be used in paints without a deleterious effect. Prior to this invention, the acid content of the polymer withdrawn from the stripping tower would be relatively high and unacceptable, that is, above 2.0 gms. of acid per 100 gms. of polymer.

*Example II*

The polymeric solution of Example I was then placed in a reactor comprising 35 wt. percent of the above copolymer in Solvesso. The solution was blown with oxygen for 1.0 hours and 5 minutes at 235° F. in the presence of 0.01 wt. percent of manganese naphthenate as a catalyst to incorporate 16% oxygen in the structure of the copolymer.

One hundred parts of this oxidized polymer were subsequently treated with 4 parts of MgO. After filtering, the acid content was determined. A surface was coated with the oxidized polymer and cured by baking at 300° to 350° F. for 30 minutes.

| | Parts MgO per 100 parts oxidized polymer | Parts Acid per 100 parts oxidized polymer | Film Thickness (mils) | Sward Hardness | Flexibility |
|---|---|---|---|---|---|
| A | 4 | 1.46 | 1.0 | 40 | ¾ |
| B | 4 | 1.46 | 1.7 | 34 | ¾ |
| C | 0 | 3.17 | 0.9 | 50 | ¾ |
| D | 0 | 3.17 | 2.2 | 44 | ¾ |
| E | 4 | 1.46 | 0.9 | 50 | ⅛ |
| F | 0 | 3.17 | 1.0 | 48 | ⅛ |

The above example demonstrates that treating an oxidized polydiolefin with a basic adsorbent will substantially lower the acid content therein with no adverse effect on film properties.

*Example III*

A sample of polymer with 10% oxygen was prepared in a similar manner as described in Example I. The oxidized polymer was then passed over anhydrous Amberlite IRA-400 at approximately .6-.9 v./v./hr. Cuts were made and submitted for acid number.

| Sample | Vol. feed/ Vol. polymer | Parts acid per 100 parts polymer |
|---|---|---|
| Control | | 1.9 |
| Cut 1 | 2 | 1.1 |
| Cut 2 | 4 | 1.2 |
| Cut 3 | 6 | 1.3 |

As can be seen a significant reduction in acidity was achieved.

Having set forth the general nature and specific embodiments of this invention, the true scope is now specifically pointed out in the appended claims.

What is claimed is:

1. An improved method for preparing an oxidized polydiolefin which comprises polymerizing a $C_4$ to $C_6$ conjugated diolefin in a reaction zone; blowing said polydiolefin with air to incorporate oxygen in its structure in the presence of a hydrocarbon solvent, said air blown polymeric solution having a $C_1$ to $C_6$ paraffinic acid formed therein; stripping said acid and said solution and withdrawing a stream from the stripping zone comprising said hydrocarbon solvent and part of said acid; mixing said stream with water to form an upper layer of the solvent and a lower layer of acid product in water; recycling said upper layer to said reaction zone; and withdrawing from the stripping zone an oxidized polydiolefin with between 0.3 to 1.5 parts of acid therein per 100 parts by weight of the polymer.

2. The method according to claim 1 in which the polymeric diolefin is selected from the group consisting of the homopolymer of butadiene and the copolymer of butadiene with styrene.

3. The method according to claim 1 in which the paraffinic acid is selected from the group consisting of formic acid, acetic acid, propionic acid, acrylic acid, and mixtures thereof.

4. The method according to claim 1 in which the polymeric diolefin is the copolymer of butadiene with styrene.

5. The method according to claim 1 in which the paraffinic acid is formic acid.

6. An improved method for providing an oxidized polydiolefin which comprises polymerizing 75 to 85% butadiene with 25 to 15% styrene in a reaction zone; blowing said copolymer with air to incorporate about 10 to 20% oxygen in its structure in the presence of a hydrocarbon solvent, said air-blown polymeric solution having therein a $C_1$ to $C_6$ paraffinic acid selected from the group consisting of formic acid, acetic acid, propionic acid, acrylic acid, and mixtures thereof; stripping said acid in said solution; withdrawing a stream from the stripping zone comprising 0.01 to 2 parts of acid per 100 parts of solvent; mixing said stream with 10 to 20 parts of water per 100 parts of solvent to form an upper layer of solvent and a lower layer of acid product in water; recycling said upper layer to said reaction zone; and withdrawing from the stripping zone an oxidized polydiolefin with between 0.3 to 1.5 parts of acid therein per 100 parts per weight of polymer.

References Cited in the file of this patent

UNITED STATES PATENTS

| | | |
|---|---|---|
| 2,367,803 | Schindler | Jan. 23, 1945 |
| 2,588,639 | Lee et al. | Mar. 11, 1952 |
| 2,669,526 | Koenecke et al. | Feb. 16, 1954 |
| 2,701,780 | Nelson et al. | Feb. 8, 1955 |
| 2,723,289 | Mills | Nov. 8, 1955 |
| 2,826,618 | Gleason | Mar. 11, 1958 |